US008650384B2

(12) United States Patent
Lee et al.

(10) Patent No.: US 8,650,384 B2
(45) Date of Patent: Feb. 11, 2014

(54) METHOD AND SYSTEM FOR DYNAMICALLY PARALLELIZING APPLICATION PROGRAM

(75) Inventors: Seung Won Lee, Hwaseong-si (KR); Shi Hwa Lee, Seoul (KR); Dong-In Kang, Annandale, VA (US); Mikyung Kang, Jeju-si (KR)

(73) Assignees: Samsung Electronics Co., Ltd., Suwon-Si (KR); University of Southern California, Los Angeles, CA (US)

( * ) Notice: Subject to any disclaimer, the term of this patent is extended or adjusted under 35 U.S.C. 154(b) by 710 days.

(21) Appl. No.: 12/662,657

(22) Filed: Apr. 27, 2010

(65) Prior Publication Data

US 2010/0281489 A1 Nov. 4, 2010

(30) Foreign Application Priority Data

Apr. 29, 2009 (KR) .................. 10-2009-0037726

(51) Int. Cl.
*G06F 9/30* (2006.01)
(52) U.S. Cl.
USPC ..................... 712/203; 712/220; 717/149
(58) Field of Classification Search
None
See application file for complete search history.

(56) References Cited

U.S. PATENT DOCUMENTS

| 5,032,986 | A | * | 7/1991 | Pathak et al. ............... 711/217 |
| 5,893,159 | A | * | 4/1999 | Schneider .................... 711/150 |
| 6,076,157 | A | * | 6/2000 | Borkenhagen et al. ....... 712/228 |
| 6,334,177 | B1 | * | 12/2001 | Baumgartner et al. ......... 712/13 |
| 6,567,389 | B1 | * | 5/2003 | Honkasalo et al. ........... 370/342 |
| 6,886,024 | B1 | * | 4/2005 | Fujita et al. .................... 709/201 |
| 6,988,186 | B2 | * | 1/2006 | Eickemeyer et al. ......... 712/217 |
| 7,010,787 | B2 | * | 3/2006 | Sakai ............................. 717/159 |
| 7,036,124 | B1 | * | 4/2006 | Patterson ....................... 718/104 |
| 7,082,601 | B2 | * | 7/2006 | Ohsawa et al. ............... 717/149 |
| 7,184,612 | B2 | * | 2/2007 | Naftali et al. ................. 382/304 |
| 7,185,185 | B2 | * | 2/2007 | Joy et al. ....................... 712/228 |
| 7,257,633 | B2 | * | 8/2007 | Masputra et al. ............. 709/226 |
| 7,343,595 | B2 | * | 3/2008 | Iley et al. ...................... 717/141 |
| 7,363,472 | B2 | * | 4/2008 | Stuttard et al. ............... 712/225 |
| 7,398,521 | B2 | * | 7/2008 | Hoflehner et al. ............ 717/151 |
| 7,447,873 | B1 | * | 11/2008 | Nordquist ....................... 712/22 |
| 7,526,636 | B2 | * | 4/2009 | Gazsi et al. ................... 712/228 |
| 7,627,864 | B2 | * | 12/2009 | Du et al. ....................... 717/151 |

(Continued)

FOREIGN PATENT DOCUMENTS

| KR | 10-2007-0059837 | 6/2007 |
| WO | WO 2007/128168 | 11/2007 |

OTHER PUBLICATIONS

Terboven et al. ("Data and Thread Affinity in OpenMP programs"; MAW'08, May 5, 2008, Ischia, Italy. Copyright 2008 ACM978-1-60558-091-Mar. 8, 2005).*

(Continued)

*Primary Examiner* — Alan S Miller
(74) *Attorney, Agent, or Firm* — Staas & Halsey LLP (57) ABSTRACT

Provided is a method and system for dynamically parallelizing an application program. Specifically, provided is a method and system having multi-core control that may verify a number of available threads according to an application program and dynamically parallelize data based on the verified number of available threads. The method and system for dynamically parallelizing the application program may divide a data block to be processed according to the application program based on a relevant data characteristic and dynamically map the threads to division blocks, and thereby enhance a system performance.

17 Claims, 6 Drawing Sheets

(56) References Cited

U.S. PATENT DOCUMENTS

| | | | | |
|---|---|---|---|---|
| 7,657,883 | B2* | 2/2010 | Jensen | 717/161 |
| 7,756,919 | B1* | 7/2010 | Dean et al. | 709/201 |
| 8,223,779 | B2* | 7/2012 | Carroll et al. | 370/401 |
| 8,255,889 | B2* | 8/2012 | Stefansson et al. | 717/149 |
| 8,266,337 | B2* | 9/2012 | Madruga et al. | 710/22 |
| 8,321,849 | B2* | 11/2012 | Nickolls et al. | 717/146 |
| 2002/0157086 | A1* | 10/2002 | Lewis et al. | 717/127 |
| 2003/0014471 | A1* | 1/2003 | Ohsawa et al. | 709/107 |
| 2003/0014473 | A1* | 1/2003 | Ohsawa et al. | 709/107 |
| 2003/0018684 | A1* | 1/2003 | Ohsawa et al. | 709/102 |
| 2003/0232616 | A1* | 12/2003 | Gidron et al. | 455/406 |
| 2006/0123401 | A1* | 6/2006 | O'Brien et al. | 717/131 |
| 2006/0143350 | A1* | 6/2006 | Miloushev et al. | 710/242 |
| 2006/0218123 | A1* | 9/2006 | Chowdhuri et al. | 707/2 |
| 2007/0033592 | A1* | 2/2007 | Roediger et al. | 718/102 |
| 2007/0157212 | A1* | 7/2007 | Berg et al. | 719/313 |
| 2008/0022072 | A1* | 1/2008 | Jung et al. | 712/209 |
| 2008/0291496 | A1* | 11/2008 | Hara | 358/1.16 |
| 2009/0070552 | A1* | 3/2009 | Kanstein et al. | 712/29 |
| 2009/0158012 | A1* | 6/2009 | Hansen et al. | 712/222 |
| 2009/0165006 | A1* | 6/2009 | Ceze et al. | 718/102 |
| 2010/0251066 | A1* | 9/2010 | Radke | 714/752 |
| 2010/0281489 | A1* | 11/2010 | Lee et al. | 718/106 |

OTHER PUBLICATIONS

Massingill et al. ("Patterns for Parallel Application Programs"; PLoP 1999 conference).*

Akkary et al. ("A Dynamic Multithreading Processor"; 1998 IEEE).*

* cited by examiner

BLOCK ALLOCATION SCHEME

FIG. 2B

CYCLING SCHEME

METHOD AND SYSTEM FOR DYNAMICALLY PARALLELIZING APPLICATION PROGRAM

CROSS-REFERENCE TO RELATED APPLICATIONS

This application claims the benefit of Korean Patent Application No. 10-2009-0037726, filed on Apr. 29, 2009, in the Korean Intellectual Property Office, the disclosure of which is incorporated herein by reference.

BACKGROUND

1. Field

One or more embodiments relate to a method and system for dynamically parallelizing an application program, and more particularly, a method and system having multi-core control that may dynamically divide a data block to be processed according to an application program, and may dynamically allocate threads to division blocks, respectively, and thereby perform a dynamic parallelization.

2. Description of the Related Art

Currently, processors including a plurality of cores to maximize silicon efficiency are popular. Because of an increase in processor density, a parallel scheme of controlling the plurality of cores, that is, multi-core control is proposed.

The parallel scheme is widely used for cluster super computers and general personal computers (PCs), due to a dissemination of a multi-core technology.

A multi-core processor having a few to tens of cores is currently produced. In the near future, a multi-core processor having hundreds or more cores will be produced.

In a parallel system having the above multi-core processor, many application programs may share increased resources. In this case, the resource demand of the application programs needs to be changed depending on an amount of available resources.

However, even when the amount of available resources is changed, a conventional parallel system may not dynamically utilize the available resources.

In a situation where a parallel application program dynamically operates in the parallel system, a number of threads determined when the parallel application program is generated may be used as resources without considering the number of available threads corresponding to the available resources. Accordingly, when more resources are desired to be used in the parallel application program, a source code may need to be changed and re-compiled.

SUMMARY

According to an aspect of one or more embodiments, there may be provided a system for dynamically parallelizing an application program, the system including a multi-core controller to assign a unique operation to each of plural threads that are generated while running the parallel application program, a block generator to generate a data block having the size of a data area to be processed by the parallel application program, using a block function, a monitoring unit to monitor the multi-core controller to determine a number of available threads, and a decision unit to divide the data block using a map function, and to dynamically determine a thread allocation scheme.

The decision unit may determine a division type of the data block and the thread allocation scheme based on a characteristic of data stored in the data block and the determined number of available threads.

The system may further include a scatter unit to generate threads of performing a same operation using a scatter function, and to allocate the threads to division blocks, respectively, according to the determined thread allocation scheme, and a gather unit to combine the threads using a gather function.

The system may further include a view unit to read data from a corresponding division block in response to a request of each of the threads, and to provide the read data to a corresponding thread, or to store a result of the thread in the corresponding division block using a view function.

According to another aspect of one or more embodiments, there may be provided a method for dynamically parallelizing an application program in a system, the method including generating a data block having the size of a data area to be processed by the application program, using a block function, determining a number of available threads, dividing the data block using a map function, and dynamically determining a thread allocation scheme, and generating threads according to the thread allocation scheme to allocate the threads to division blocks, respectively.

The dividing of the data block and the dynamically determining of the thread allocation scheme further may include determining a division type of the data block and the thread allocation scheme based on a characteristic of data stored in the data block and the determined number of available threads.

The generating of the threads may include generating threads of performing a same operation using a scatter function, to allocate the threads to division blocks, respectively, according to the dynamically determined thread allocation scheme, reading data from a corresponding division block in response to a request of each of the threads, to provide the read data to a corresponding thread using a view function, performing a unique operation in each of the threads, storing a result of the thread in a corresponding division block using the view function, and combining the threads using a gather function.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the exemplary embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

According to one or more embodiments, there is provided a system and method having multi-core control that may dynamically divide a data block to be processed according to an application program and dynamically allocate threads to division blocks, respectively, and thereby perform a dynamic parallelization.

Figure 1:
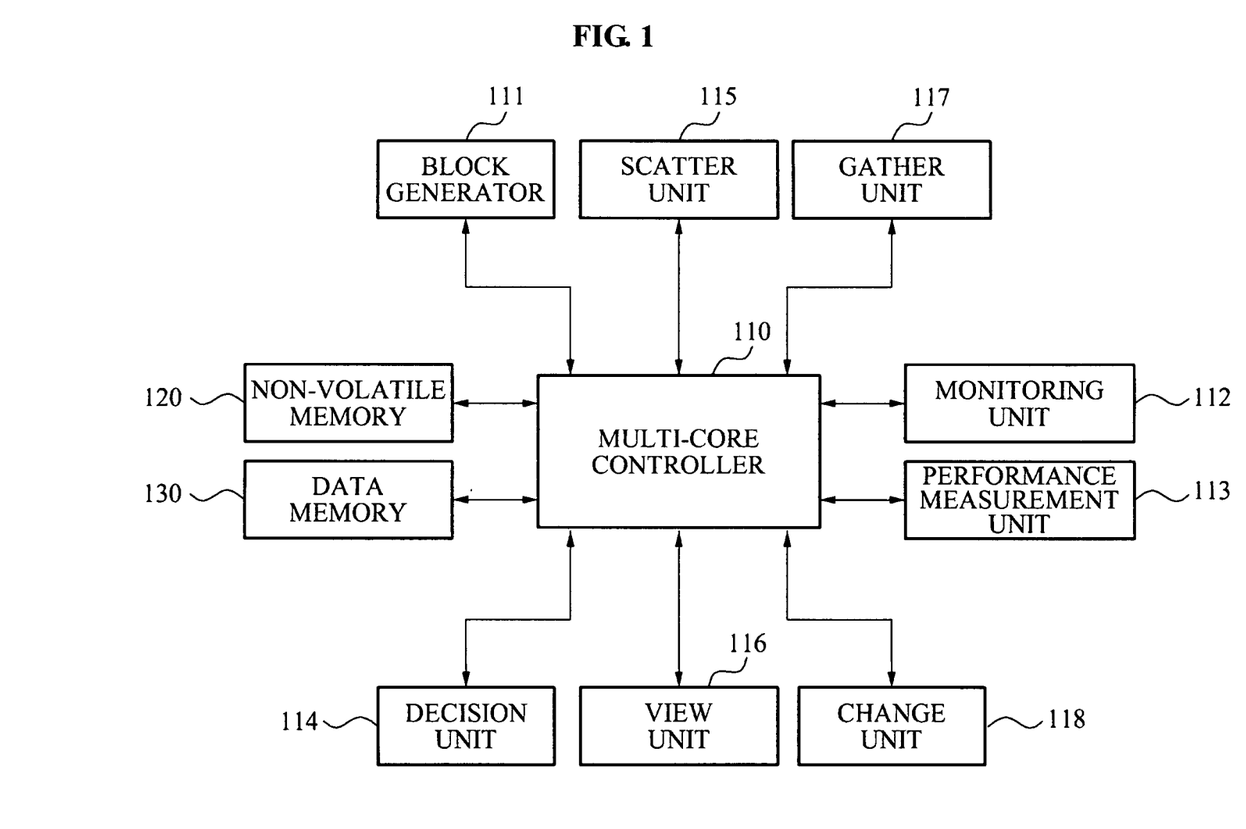
FIG. 1 illustrates a configuration of a system for dynamically parallelizing an application program, according to one or more embodiments.

FIG. 1 illustrates a configuration of a system for dynamically parallelizing a parallel application program, according to one or more embodiments.

The system may include a multi-core controller 110, a block generator 111, a monitoring unit 112, a performance measurement unit 113, a decision unit 114, a scatter unit 115, a view unit 116, a gather unit 117, a change unit 118, a non-volatile memory 120, and a data memory 130, for example.

The non-volatile memory 120 may store a system parameter and storage data. The non-volatile memory 120 may store an application program, and may store input data to be processed by the application program.

The data memory 130 may temporarily store a data block to be processed by the application program. The data memory 130 may use a Random Access Memory (RAM), for example.

The multi-core controller 110 may have at least two cores, and may function to drive the application program, and to assign a unique function or operation to each of threads generated according to the application program. A number of threads may be generated to be within the number of available cores.

The block generator 111 may verify a data area to be processed by the application program, generate a data block having the size of the data area using a block function, and store the generated data block in the data memory 130.

The monitoring unit 112 may monitor the multi-core controller 110 to verify a number of available threads. The number of available threads indicates a total number of threads that may be simultaneously processed based on a number of available cores that are in an idle state.

The performance measurement unit 113 may measure or predict a performance of the thread allocation system according to the application program.

When a decision request is received according to a progress sequence of the application program, the decision unit 114 may divide the generated data block using a map function, and determine a thread allocation scheme. The data block may be divided according to an input of a programmer, or may be divided based on a characteristic of data stored in the data block.

To consider the number of available threads and the characteristic of data stored in the data block, the decision unit 114 may utilize the thread allocation scheme and a division of the data block having a determined optimum performance based on the measurement or prediction of the thread allocation system according to the parallel application program.

Figure 2A:
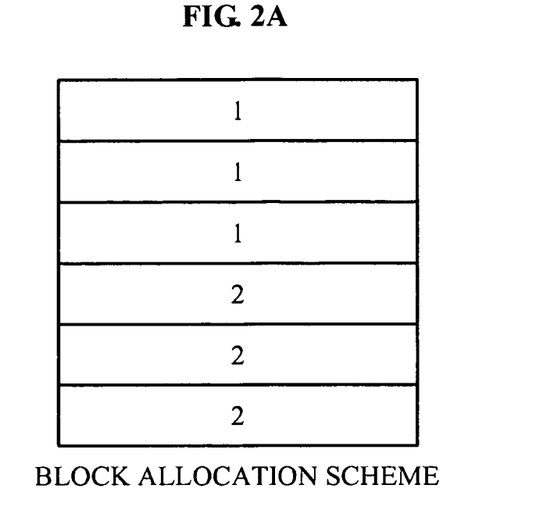
FIGS. 2A and 2B illustrate allocating of threads in a system, according to one or more embodiments.
Figure 2B:
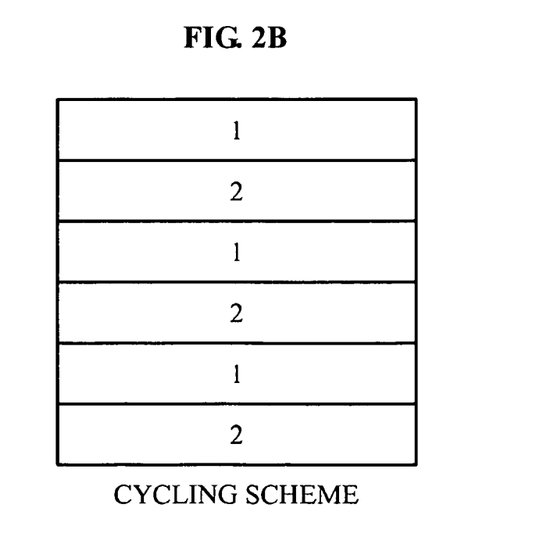

FIGS. 2A and 2B illustrate an allocating of threads in a system, according to one or more embodiments.

FIGS. 2A and 2B show a scheme of allocating two threads {1, 2}. FIG. 2A shows a block allocation scheme, as an available thread allocation scheme. The block allocation scheme may divide a data block into division blocks having approximately equal sizes, and allocate the same thread to adjacent division blocks. The block allocation scheme may be appropriate when data correlation between the adjacent division blocks is relatively high according to an aspect of the relevant data characteristic.

FIG. 2B shows a cycling scheme, as another available thread allocation scheme. The cycling scheme may alternately allocate a thread to division blocks based on a round-robin scheme. The cycling scheme may be appropriate when a data correlation between the adjacent division blocks is relatively low according to an aspect of the relevant data characteristic.

In addition to the aforementioned two schemes, various types of thread allocation schemes may alternatively be applicable.

The decision unit 114 may divide the data block based on the number of available threads and the corresponding data characteristic since the number of available threads and the data characteristic may greatly affect the performance of the application program resulting from the number of divisions and division type. The performance of the application program may vary depending on which thread allocation scheme is used.

When a distribution request is received, according to the progress sequence of the application program, the scatter unit 115 may generate threads for performing the same operation using a scatter function, and may allocate the threads to the division blocks, respectively, according to the determined thread allocation scheme.

The view unit 116 may read data from each of the division blocks allocated with the threads, and provide the data to each of the threads using a view function. The view unit 116 may receive an operation result from each of the threads, and may store the operation result in a division block corresponding to each of the threads using the view function.

Specifically, in response to a request from a thread, the view unit 116 may apply the view function to the thread, and may approach a corresponding data block of the thread to thereby read and write data.

When a combination request is received according to the progress sequence of the parallel application program, the gather unit 117 may combine distributed threads into a single thread using a gather function.

When a request of a programmer, for example, is received, or when a change event according to a change in the number of available threads is detected via the monitoring unit 112, the change unit 118 may increase or decrease the number of threads using a change function. When a change request is received according to the progress sequence of the application program, the change unit 118 may increase or decrease the number of threads using the change function.

The multi-core controller 110 may control the application program and the threads, and may also control the block generator 111, the monitoring unit 112, the performance measurement unit 113, the decision unit 114, the scatter unit 115, the view unit 116, the gather unit 117, and the change unit 118. For example, the multi-core controller 110 may control functions of the block generator 111, the monitoring unit 112, the performance measurement unit 113, the decision unit 114, the scatter unit 115, the view unit 116, the gather unit 117, and the change unit 118. Here, though the above constituent elements are separately shown in the figures, this is done only to separately describe functions of the constituent elements. Accordingly, when an actual product is produced, a portion of or all of the block generator 111, the monitoring unit 112, the performance measurement unit 113, the decision unit 114, the scatter unit 115, the view unit 116, the gather unit 117, and the change unit 118 may be collectively configured to be processed by the multi-core controller 110.

When the system of FIG. 1 is constructed as a library, the library for a dynamic parallelization may include a block function, a map function, a scatter function, a view function, a gather function, and a change function.

Hereinafter, matters dynamically changed by the system when the application program dynamically operates will be described. First, the system may dynamically change the number of threads based on resources available in multi-core control. Second, the system may dynamically change a division type of the data block and a thread allocation scheme based on the number of available threads and characteristics of the relevant data.

The application program dynamically operating in the system may have various types of parallel forms according to various types of combinations among the block function, the map function, the scatter function, the view function, the gather function, and the change function, for example.

FIGS. 3A through 3D illustrate parallelizing of an application program of a system, according to one or more embodiments.

Figure 3A:
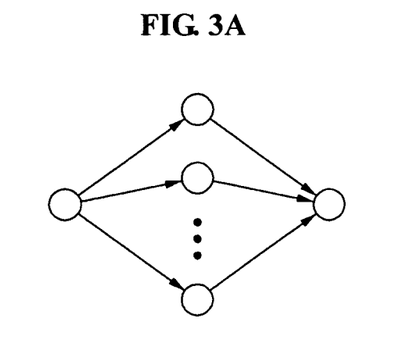
FIGS. 3A through 3D illustrate parallelizing of an application program of a system, according to one or more embodiments.

FIG. 3A illustrates a basic parallel form that is a structure where a thread is distributed into a number of threads corresponding to a number of available threads and the distributed threads are combined into a single thread.

Figure 3B:
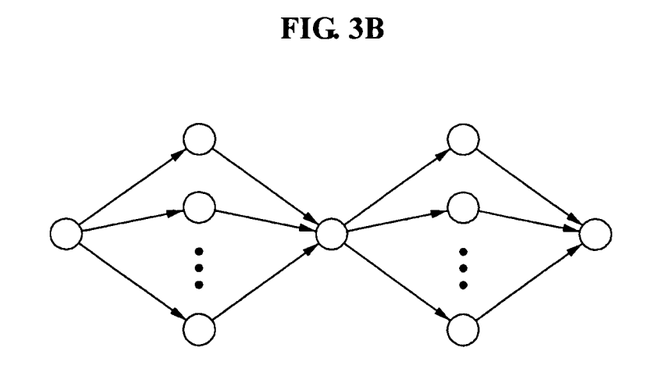

FIG. 3B illustrates a cascade parallel form that is a structure where the basic parallel form of FIG. 3A is sequentially repeated.

Figure 3C:
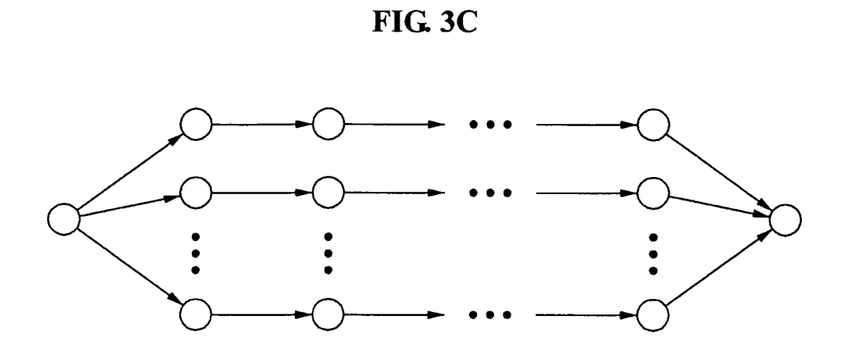

FIG. 3C illustrates a pipeline parallel form that is a structure where a thread is distributed into a number of threads corresponding to the number of available threads and then the same number of threads are maintained to perform a unique operation of each thread, with the threads then being combined into a single thread at a final stage.

Figure 3D:
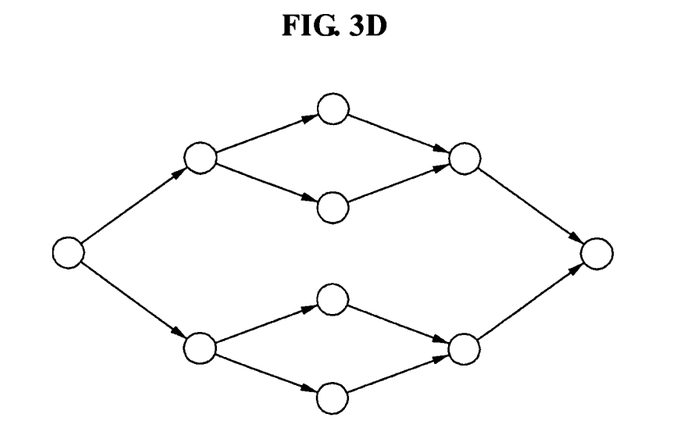

FIG. 3D illustrates a tree parallel form that is a structure where the number of threads gradually increases through a distribution and then the distributed threads are gradually combined back into a single thread.

Although four parallel forms are illustrated, a large number of parallel forms may be applicable according to combinations of the block function, the map function, the scatter function, the view function, the gather function, and the change function, for example.

Hereinafter, as only an example, a method for dynamically parallelizing an application program in a system constructed as above will be described.

Figure 4:
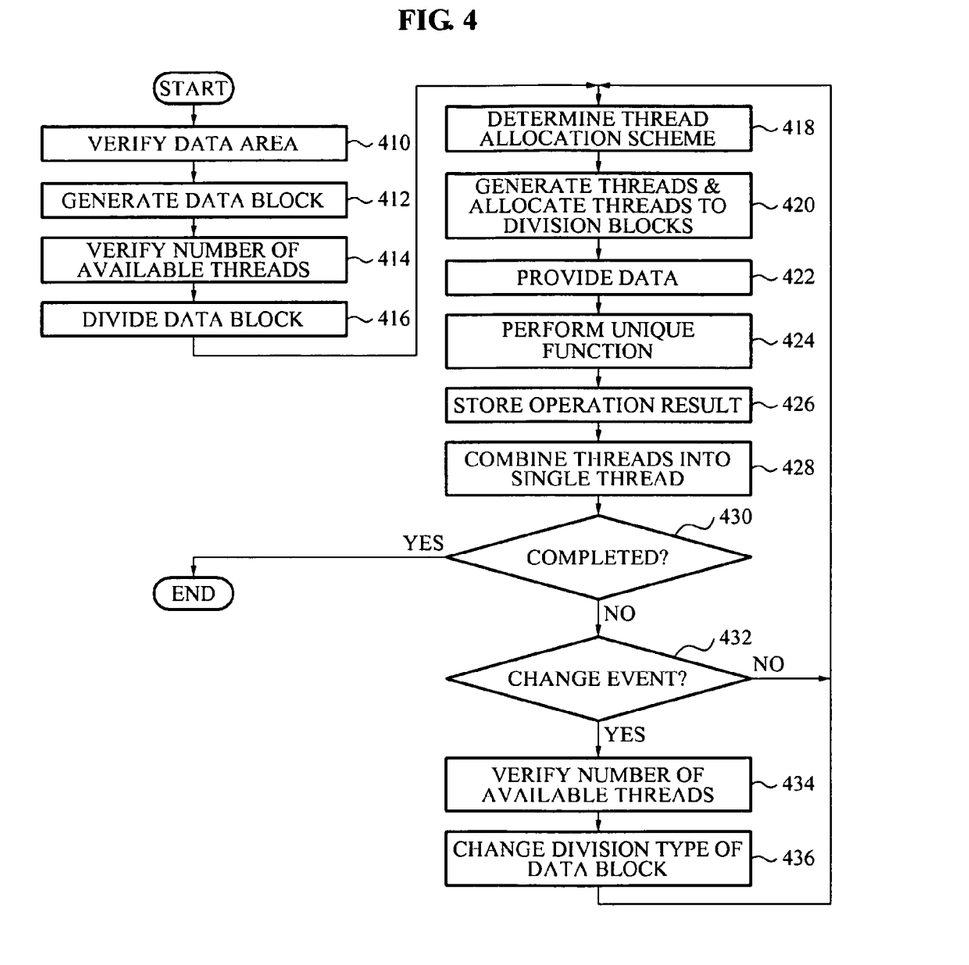
FIG. 4 illustrates a flowchart of a method for dynamically parallelizing an application program in a system, according to one or more embodiments.

FIG. 4 illustrates a flowchart of a method for dynamically parallelizing an application program in a system, according to one or more embodiments.

The application program of FIG. 4 may have a thread structure of a basic parallel form, for example. In operation 410, the application program may verify a data area to process. In operation 412, the application program may generate a data block having a size corresponding to the data area.

In operation 414, the application program may verify a number of available threads. In operation 416, the application program may divide a data block based on the number of available threads and a determined characteristic of the data stored in the data block. In operation 418, the application program may determine a thread allocation scheme based on the number of available threads and the data characteristic.

In operation 420, the application program may generate threads to perform the same operation using a scatter function and allocate the threads to division blocks, respectively, according to the determined thread allocation scheme.

In operation 422, the application program may provide data of a division block corresponding to each of the threads using a view function. In operation 424, the application program may perform a unique operation in each of the threads. In operation 426, the parallel application program may store an operation result of each of the threads in a corresponding division block using the view function.

In operation 428, the application program may combine the distributed threads into a single thread using a gather function.

In operation 430, the application program may verify whether the dynamic parallelization of the application program is completed.

When the dynamic parallelization is completed, a dynamic parallelization algorithm may be terminated. Conversely, when the dynamic parallelization is not completed, the application program may determine whether a change event is detected in operation 432. The change event may occur according to a request of a programmer, for example, a change in the number of available threads, or a progress sequence that is preset when the application program is generated.

When the change event is detected, the application program may verify the number of available threads in operation 434, and change a division type of the data block based on the number of available threads and the characteristic of the data stored in the data block in operation 436. The application program may then return to operation 418.

Conversely, when the change event is not detected, the application program may just return to operation 418.

Figure 5:
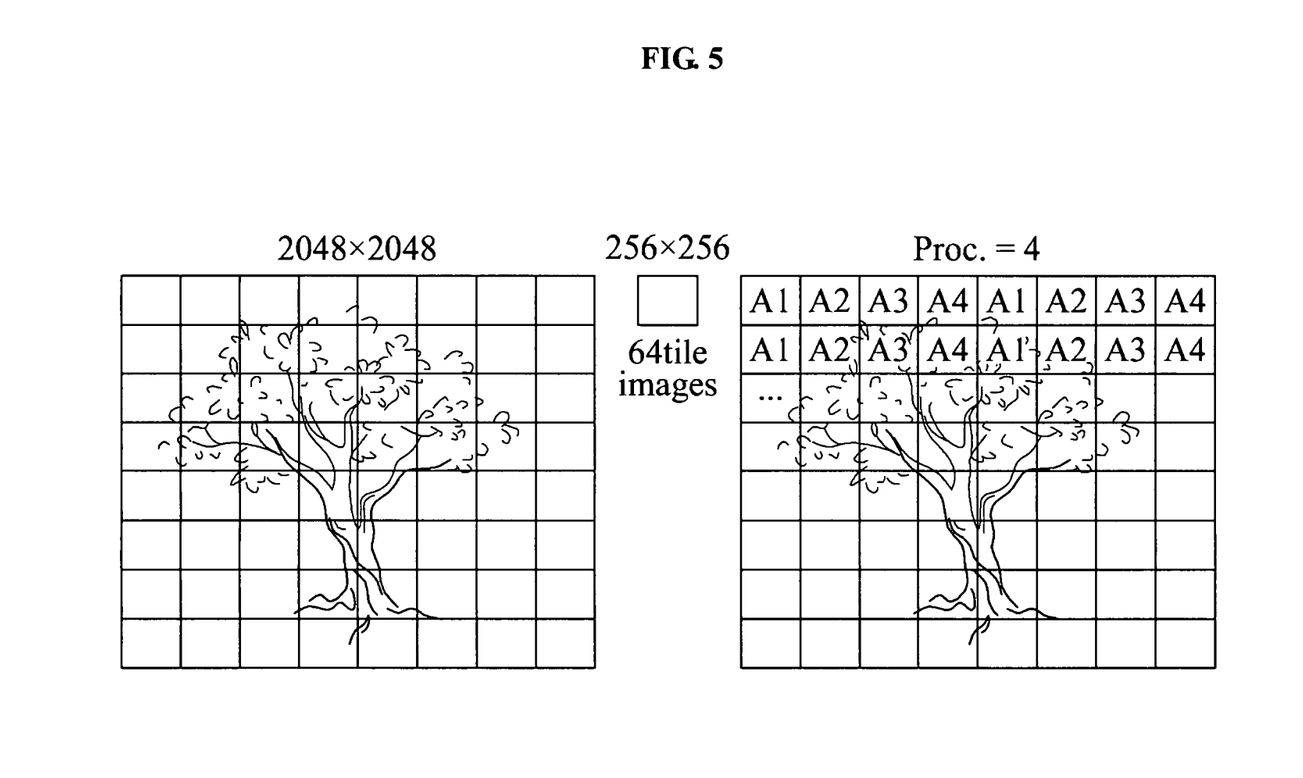
FIG. 5 illustrates an allocating of threads for a J2K codec, according to one or more embodiments.

FIG. 5 illustrates an allocating of threads in a J2K codec, according to one or more embodiments. Referring to FIG. 5, the illustrated left image to be encoded may have a 2048× 2048 pixel size. As illustrated, when the image is divided into 256×256 pixel sizes, the image may include 64 tile images.

Thus, the illustrated left image side of FIG. 5 shows the case where the J2K codec performs encoding without dynamic parallelization, i.e., a single thread may be needed to encode each of the 64 tile images. Accordingly, the total encoding time may be 64 times the amount of time needed to encode a single tile.

The illustrated right image of FIG. 5 shows the case where the J2K codec performs encoding according to a dynamic parallelization. Here, four available threads A1, A2, A3, and A4 may exist. In this case, it is possible to decrease the amount of time by a factor of four, compared to the non-dynamic parallelization encoding, by parallelizing the four threads.

Specifically, as shown in the illustrated right image of FIG. 5, when the threads are paralleled, it is possible to enhance a system performance by maximally using the available threads.

According to one or more embodiments, there is provided a system and method having multi-core control that may dynamically divide a data block to be processed by an application program and dynamically allocate distributed threads to division blocks, respectively, and thereby may perform a dynamic parallelization. Through this, it is possible to verify a number of available threads and to dynamically parallelized data. The system performance may be enhanced by dividing a data block and dynamically allocating the threads using a most efficient scheme based on a characteristic of the data stored in the data block and the number of available threads when dividing a data block and dynamically allocating the threads.

The above-described exemplary embodiments may be implemented by non-transient computer-readable media including computer readable code, such as program instructions, to control at least one processing device, such as a processor or computer. The media may also include, in combination with the example program instructions, data files, data structures, and the like. Examples of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of computer readable code include both machine code, such as produced by a compiler, and files containing higher level code that may be executed by the at least one processing device using an interpreter.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A system for dynamically parallelizing an application program, the system comprising:
   a block generator to generate a data block having a size corresponding to a data area to be processed by the application program, using a block function;
   a multi-core controller including at least one processing device to assign, according to a thread allocation scheme and the generated data block, a unique operation of each of a number of available threads that are generated while running the application program;
   a monitoring unit to monitor the multi-core controller to determine, after a performance of at least one of the unique operations, the number of available threads, during the running of the application program; and
   a decision unit to selectively divide the data block using a map function and change the thread allocation scheme based on the determined number of available threads, during the running of the application program.

2. The system of claim 1, wherein the decision unit determines a division type of the data block and the thread allocation scheme based on a characteristic of data stored in the data block and the determined number of available threads.

3. The system of claim 1, wherein the thread allocation scheme corresponds to any one of a block allocation scheme of allocating a same thread to an adjacent division block, and a cycling scheme of alternately allocating a thread according to a round-robin scheme.

4. The system of claim 1, further comprising:
   a scatter unit to generate threads of performing a same operation using a distribution, and to allocate the threads to division blocks, respectively, according to the determined thread allocation scheme; and
   a gather unit to combine the threads using a combination function.

5. The system of claim 4, further comprising:
   a view unit to read data from a corresponding division block in response to a request of each of the threads, and to provide the read data to a corresponding thread, or to store a result of the thread in the corresponding division block using a view function.

6. The system of claim 4, further comprising:
   a change unit to selectively increase or decrease the number of threads using a change function when a change in the number of available threads is detected by the monitoring unit.

7. The system of claim 1, further comprising:
   a performance measurement unit to measure or predict a performance of the thread allocation system according to a division type of the data block and the thread allocation scheme,
   wherein the decision unit determines the thread allocation scheme and the division type of the data block having a determined optimum performance based on the measurement or prediction of the performance measurement unit.

8. A system for dynamically parallelizing an application program, the system comprising:
   a multi-core controller including at least one processing device to assign a unique operation of each of plural threads that are generated while running the application program;
   a block generator to generate a data block having a size corresponding to a data area to be processed by the application program, using a block function;
   a monitoring unit to monitor the multi-core controller to determine a number of available threads; and
   a decision unit to divide the data block using a map function, and to dynamically determine a thread allocation scheme, further comprising:
   a performance measurement unit to measure or predict a performance of the thread allocation system according to a division type of the data block and the thread allocation scheme,
   wherein the decision unit dynamically determines the thread allocation scheme and the division type of the data block having a determined optimum performance based on the measurement or prediction of the performance measurement unit.

9. A system for dynamically parallelizing an application program, the system comprising:
   a multi-core controller including at least one processing device to assign a unique operation of each of plural threads that are generated while running the application program;
   a block generator to generate a data block having a size corresponding to a data area to be processed by the application program, using a block function;
   a monitoring unit to monitor the multi-core controller to determine a number of available threads;
   a decision unit to divide the data block using a map function, and to dynamically determine a thread allocation scheme;
   a scatter unit to generate threads of performing a same operation using a distribution, and to allocate the threads to division blocks, respectively, according to the determined thread allocation scheme;
   a gather unit to combine the threads using a combination function; and
   a change unit to selectively increase or decrease the number of threads using a change function when a change in the number of available threads is detected by the monitoring unit.

10. The system of claim 9, wherein, when a change in the number of available threads is detected by the monitoring unit, the change unit requests the decision unit to change a division type of the data block and the thread allocation scheme.

11. A method for dynamically parallelizing an application program in a system, the method comprising:
   generating, using at least one processing device, a data block having a size corresponding to a data area to be processed by the parallel application program, using a block function;
   assigning, according to a thread allocation scheme and the generated data block, a unique operation of each of a number of available threads that are generated while running the application program;
   determining, after a performance of at least one of the unique operations, the number of available threads, during the running of the application program;
   selectively dividing the data block using a map function and changing the thread allocation scheme based on the determined number of available threads, during the running of the application program; and
   generating threads according to the selectively changed thread allocation scheme to allocate the threads to the selectively divided data blocks, respectively.

12. The method of claim 11, wherein the selective dividing of the data block and changing of the thread allocation scheme further comprises determining a division form of the data block and the thread allocation scheme based on a characteristic of data stored in the data block and the determined number of available threads.

13. The method of claim 11, wherein the thread allocation scheme corresponds to any one of a block allocation scheme of allocating a same thread to an adjacent division block, and a cycling scheme of alternately allocating a thread according to a round-robin scheme.

14. The method of claim 11, wherein the selective dividing of the data block and changing of the thread allocation scheme further comprises:
   measuring or predicting a performance of the thread allocation system according to a division type of the data block and the thread allocation scheme; and
   determining the thread allocation scheme and the division form of the data block having a determined optimum performance based on the measured or predicted performance.

15. The method of claim 11, wherein the generating of the threads further comprises:
   generating threads of performing a same operation using a scatter function, to allocate the threads to division blocks, respectively, according to the selectively changed thread allocation scheme;
   reading data from a corresponding division block in response to a request of each of the threads, to provide the read data to a corresponding thread using a view function;
   performing a unique operation in each of the threads;
   storing a result of the thread in a corresponding division block using the view function; and
   combining the threads using a gather function.

16. The method of claim 15, wherein the generating of the threads further comprises:
   selectively increasing or decreasing the number of threads using a change function when a change in the determined the number of available threads is detected.

17. The method of claim 16, wherein the generating of the threads further comprises:
   changing a division type of the data block and the thread allocation scheme using the map function when the change in the determined number of available threads is detected.

* * * * *

UNITED STATES PATENT AND TRADEMARK OFFICE
CERTIFICATE OF CORRECTION

| | | |
|---|---|---|
| PATENT NO. | : 8,650,384 B2 | Page 1 of 1 |
| APPLICATION NO. | : 12/662657 | |
| DATED | : February 11, 2014 | |
| INVENTOR(S) | : Seung Won Lee et al. | |

It is certified that error appears in the above-identified patent and that said Letters Patent is hereby corrected as shown below:

In the Claims

Column 10, Line 27-28, in Claim 16, after "determined" delete "the".

Signed and Sealed this
Thirtieth Day of December, 2014

Michelle K. Lee
*Deputy Director of the United States Patent and Trademark Office*